United States Patent
Shishikura et al.

(10) Patent No.: US 8,716,167 B2
(45) Date of Patent: May 6, 2014

(54) CATALYST FOR FUEL CELL AND POLYMER ELECTROLYTE FUEL CELL USING THE SAME

(75) Inventors: Toshikazu Shishikura, Chiba (JP); Ryuji Monden, Chiba (JP); Kunchan Lee, Chiba (JP); Yasuaki Wakizaka, Chiba (JP); Kenichiro Ota, Koganei (JP)

(73) Assignee: Showa Denko K.K., Tokyo (JP)

( * ) Notice: Subject to any disclaimer, the term of this patent is extended or adjusted under 35 U.S.C. 154(b) by 102 days.

(21) Appl. No.: 13/376,147

(22) PCT Filed: Jun. 2, 2010

(86) PCT No.: PCT/JP2010/059325
§ 371 (c)(1),
(2), (4) Date: Dec. 2, 2011

(87) PCT Pub. No.: WO2010/140612
PCT Pub. Date: Dec. 9, 2010

(65) Prior Publication Data
US 2012/0083407 A1  Apr. 5, 2012

(30) Foreign Application Priority Data
Jun. 3, 2009 (JP) .................. 2009-134277

(51) Int. Cl.
| B01J 21/18 | (2006.01) |
| B01J 27/20 | (2006.01) |
| B01J 27/24 | (2006.01) |
| H01M 4/02 | (2006.01) |
| H01M 4/13 | (2010.01) |
| H01M 4/58 | (2010.01) |

(52) U.S. Cl.
USPC ........ 502/174; 502/200; 429/209; 429/218.1; 429/231.5; 429/231.8

(58) Field of Classification Search
USPC ........... 502/174, 200; 429/209, 218.1, 231.5, 429/231.8
See application file for complete search history.

(56) References Cited

U.S. PATENT DOCUMENTS

| 4,572,813 A | 2/1986 | Arakawa |
| 4,575,813 A | 3/1986 | Bartlett et al. |
| 4,849,288 A * | 7/1989 | Schmaderer et al. ......... 428/366 |
| 7,005,401 B2 | 2/2006 | Lu et al. |
| 2002/0051903 A1 | 5/2002 | Masuko et al. |
| 2010/0227253 A1 | 9/2010 | Monden et al. |
| 2010/0331172 A1* | 12/2010 | Monden et al. ............... 502/174 |
| 2011/0008709 A1* | 1/2011 | Shishikura et al. ........... 429/483 |
| 2011/0053049 A1* | 3/2011 | Imai et al. ..................... 429/523 |
| 2011/0059386 A1* | 3/2011 | Monden et al. ............... 429/483 |
| 2011/0189583 A1* | 8/2011 | Imai et al. ..................... 429/482 |
| 2012/0094207 A1* | 4/2012 | Wakizaka et al. ............. 429/482 |
| 2013/0115542 A1* | 5/2013 | Imai et al. ..................... 429/482 |

FOREIGN PATENT DOCUMENTS

| CN | 1387274 A | 12/2002 |
| JP | 60-027700 A | 2/1985 |
| JP | 60-054998 A | 3/1985 |
| JP | 2778434 B2 | 7/1998 |

(Continued)

Primary Examiner — Patricia L Hailey
(74) Attorney, Agent, or Firm — Sughrue Mion, PLLC

(57) ABSTRACT

[Problem] To provide a catalyst which has high oxygen reduction activity, also has excellent durability, and is inexpensive and excellent in electric power generation cost as compared with noble metal catalysts such as platinum.
[Solution to problem] A catalyst for a polymer electrolyte fuel cell, including a graphitized carbon powder and a niobium oxycarbonitride or a titanium oxycarbonitride as an active substance, and a polymer electrolyte fuel cell using the catalyst.

9 Claims, 5 Drawing Sheets

(56) References Cited

FOREIGN PATENT DOCUMENTS

| JP | 2006-107967 A | 4/2006 |
| JP | 2007-257888 A | 10/2007 |
| JP | 2008-155111 A | 7/2008 |
| JP | 2008-235156 A | 10/2008 |
| WO | WO 01/92151 A1 | 12/2001 |
| WO | 2009/031383 * | 3/2009 | ............... B01J 27/24 |
| WO | WO 2009/031383 A1 | 3/2009 |
| WO | 2009/091047 * | 7/2009 | ............... B01J 27/24 |
| WO | 2009/107518 * | 9/2009 | ............... B01J 27/24 |

* cited by examiner

CATALYST FOR FUEL CELL AND POLYMER ELECTROLYTE FUEL CELL USING THE SAME

CROSS REFERENCE TO RELATED APPLICATION

This application is a National Stage of International Application No. PCT/JP2010/059325, filed on Jun. 2, 2010, claiming priority based on Japanese Patent Application No. 2009-134277, filed Jun. 3, 2009.

TECHNICAL FIELD

The present invention relates to a catalyst for a fuel cell and a fuel cell using the catalyst. More particularly, the present invention relates to a catalyst for a polymer electrolyte fuel cell, which comprises a graphitized carbon powder and a niobium oxycarbonitride or a titanium oxycarbonitride as an active substance, and a polymer electrolyte fuel cell using the catalyst.

BACKGROUND ART

Fuel cells are classified into various types according to the types of electrolytes or the types of electrodes.

Typical types are alkaline type, phosphoric acid type, molten carbonate type, solid electrolyte type and solid polymer type. Of these, fuel cells of the solid polymer type capable of working at temperatures ranging from low temperatures (about −40° C.) to about 120° C. have been paid attention, and development and practical use of them as power sources for low-pollution automobiles have been promoted. As uses of the polymer electrolyte fuel cells, vehicle drive sources and stationary power sources have been studied. In order to apply the fuel cells to these uses, durability over a long period of time is required.

In this polymer solid fuel cell, a polymer solid electrolyte is sandwiched between an anode and a cathode. A fuel is fed to the anode, oxygen or air is fed to the cathode, and oxygen is reduced in the cathode to produce electricity. As the fuel, hydrogen or methanol is mainly used.

For increasing reaction rate in a fuel cell and thereby enhancing energy conversion efficiency of the fuel cell, a layer containing a catalyst (also referred to as a "fuel cell catalyst layer" hereinafter) has been provided on the surface of the cathode (air electrode) or the anode (fuel electrode) of the fuel cell in the past.

As the catalyst, a noble metal is generally used, and of such noble metals, platinum that is stable at a high electric potential and has high activity has been mainly used. However, since platinum is expensive and its resource quantity is limited, development of alternative catalysts has been demanded. Further, the noble metal used on the cathode surface is sometimes dissolved in an acidic atmosphere, and there is a problem that the noble metal is not suitable for the uses requiring long-term durability. On this account, development of catalysts that are not corroded in an acidic atmosphere, are excellent in durability, have high oxygen reduction activity and are low in the electric power generation cost has been strongly demanded.

On the other hand, carbon has been used in the past as a support for supporting the catalyst metal.

The catalytic activity of the carbon cannot be enhanced unless its specific surface area is increased, and therefore, particle diameters of the carbon need to be decreased. However, there is technical limitation on the decrease of the particle diameters of carbon, and satisfactory catalytic activity cannot be obtained yet.

Moreover, carbon has low heat resistance, and when reaction proceeds in a fuel cell, carbon is corroded and is lost. Hence, there occurs a phenomenon that the catalyst metal particles supported on the carbon are liberated from the support and the catalyst metal is aggregated. As a result, the effective area is decreased and the cell performance is lowered.

In a patent literature 1, a case of using specific carbon as a support for a fuel cell catalyst is disclosed. It is described that the fuel cell catalyst using this carbon (described also as "carbon powder" in the specification) as a support for supporting a catalyst of platinum or a platinum alloy has higher electric power generation efficiency and longer life than fuel cell catalysts using other carbons.

In the patent literature 1, however, platinum is essential as the catalyst metal, and it is difficult to obtain satisfactory electric power generation cost even if the above effects are taken into consideration.

CITATION LIST

Patent Literature

Patent literature 1: WO01/092151

SUMMARY OF INVENTION

Technical Problem

The present invention is intended to solve such problems associated with the prior art. It is therefore an object of the present invention to provide a fuel cell catalyst having excellent durability and capable of realizing high catalytic performance and a polymer electrolyte fuel cell using the catalyst.

Solution to Problem

The present inventors have earnestly studied, and as a result, they have found that a catalyst for a polymer electrolyte fuel cell, which comprises a graphitized carbon powder and a niobium oxycarbonitride or a titanium oxycarbonitride as an active substance, can become a catalyst which has higher performance and is lower in the electric power generation cost than the conventional catalysts for polymer electrolyte fuel cells. Based on the finding, the present invention has been completed.

The present invention is concerned with, for example, the following (1) to (11).

(1) A catalyst for a polymer electrolyte fuel cell, comprising a graphitized carbon powder and a niobium oxycarbonitride or a titanium oxycarbonitride as an active substance.

(2) The catalyst for a polymer electrolyte fuel cell as stated in (1), wherein the carbon powder is a carbon powder having been obtained by heating carbon black at not lower than 2500° C. in a non-oxidizing atmosphere.

(3) The catalyst for a polymer electrolyte fuel cell as stated in (2), wherein the carbon black is at least one substance selected from the group consisting of oil furnace black, acetylene black, thermal black and channel black.

(4) The catalyst for a polymer electrolyte fuel cell as stated in (2) or (3), wherein boron is contained in an amount of 0.01 to 5% by mass in the carbon black.

(5) The catalyst for a polymer electrolyte fuel cell as stated in any one of (1) to (4), further comprising a fibrous carbon.

(6) The catalyst for a polymer electrolyte fuel cell as stated in (5), wherein the fibrous carbon is a vapor grown carbon fiber.

(7) The catalyst for a polymer electrolyte fuel cell as stated in (6), wherein the vapor grown carbon fiber is a carbon fiber having been graphitized at a temperature of not lower than 2500° C., and the boron content in the carbon fibers is in the range of 0.01 to 5% by mass.

(8) The catalyst for a polymer electrolyte fuel cell as stated in any one of (1) to (7), wherein the niobium oxycarbonitride is represented by the compositional formula NbCxNyOz, wherein x, y and z represent a ratio of the number of atoms and are numbers satisfying the conditions of $0.01 < x \leq 2$, $0.01 \leq y \leq 2$, $0.01 \leq z \leq 3$ and $x+y+z \leq 5$, and when the niobium oxycarbonitride is subjected to powder X-ray diffractometry (Cu—Kα rays), two or more diffraction peaks are observed between a diffraction angle 2θ of 33° and that of 43°.

(9) The catalyst for a polymer electrolyte fuel cell as stated in any one of (1) to (8), wherein when the niobium oxycarbonitride is subjected to powder X-ray diffractometry (Cu—Kα rays), a peak assigned to $Nb_{12}O_{29}$ is observed.

(10) The catalyst for a polymer electrolyte fuel cell as stated in any one of (1) to (7), wherein the titanium oxycarbonitride is represented by the compositional formula TiCxNyOz, wherein x, y and z represent a ratio of the number of atoms and are numbers satisfying the conditions of $0 < x \leq 1.00$, $0 < y \leq 1.00$, $0.1 \leq z \leq 3.0$, $1.0 \leq x+y+z \leq 5.0$ and $2.0 \leq 4x+3y+2z$, and by powder X-ray diffractometry (Cu—Kα rays), the titanium oxycarbonitride is found to have a rutile-type crystal structure.

(11) A polymer electrolyte fuel cell having a cathode catalyst layer containing the catalyst as stated in any one of (1) to (10).

Advantageous Effects of Invention

The catalyst of the present invention has high oxygen reduction activity, also has excellent durability, is inexpensive as compared with noble metal catalysts such as platinum and is excellent in electric power generation cost. Consequently, also the polymer electrolyte fuel cell using the catalyst is relatively inexpensive and exhibits excellent performance.

DESCRIPTION OF EMBODIMENTS

Carbon Powder

Figure 1:
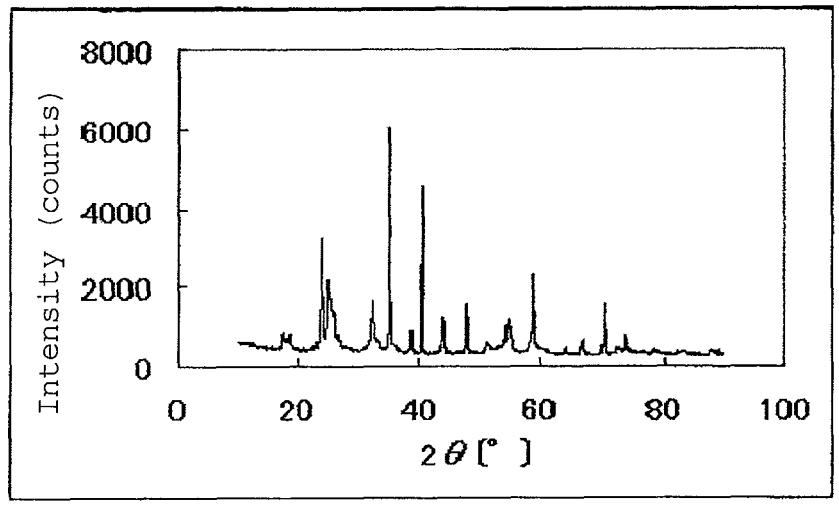
FIG. 1 shows a powder X-ray diffraction spectrum of a catalytically active substance of Example 1.

The fuel cell catalyst of the present invention is characterized by comprising a graphitized carbon powder and a niobium oxycarbonitride or a titanium oxycarbonitride as an active substance.

In the catalyst of the present invention, the graphitized carbon powder may be used as a support, but it does not necessarily have to be used as a support. An appropriate mixture of the graphitized carbon powder and the active substance may be used.

Carbon black that is generally widely used as a carbon powder for a support is subject to oxidation deterioration and is chemically unstable. On that account, an attempt to graphitize carbon black by high-temperature heating and thereby chemically stabilize it has been made. However, carbon black is a slightly graphitizable material, and graphitization thereof has been difficult in the past.

According to WO01/092151, however, when carbon black in a mixed state with a boron compound, such as boron carbide ($B_4C$), boron oxide or boron nitride, said boron compound having been crushed into particles of not more than 40 μm, is subjected to heat treatment at not lower than 2500° C. in a non-oxidizing atmosphere, a graphitized carbon powder having an X-ray spacing C0 of not more than 0.680 nm, that is, $d_{002}$ of not more than 3.40 Å, can be obtained. Details of the production process are described in WO01/092151.

Although the X-ray spacing C0 varies a little depending upon the degree of graphitization, the "graphitized carbon powder" in the present invention refers to a carbon powder having an X-ray spacing C0 of not more than 0.680 nm, that is, $d_{002}$ of not more than 3.40 Å. The X-ray spacing C0 is preferably not more than 0.673 nm. The lower limit of the X-ray spacing C0 is 0.6708 nm that is a theoretical value of graphite.

As a raw material carbon powder of the graphitized carbon powder in the present invention, carbon black is preferable. The carbon black used herein may be any of oil furnace black (trade name: Ketjen Black (registered trademark), VULCAN (registered trademark), or the like), acetylene black (trade name: Denka Black (registered trademark) or the like), thermal black, channel black, etc.

Of these, oil furnace black and acetylene black are preferable because they have a high structure (having a large number of primary particles and branched complicated connections of particles).

The present inventors have found that a catalyst of a mixture of a carbon powder obtained by graphitizing carbon black selected from the above carbon blacks and a niobium oxycarbonitride or a titanium oxycarbonitride as an active substance becomes a fuel cell catalyst which has high oxygen reduction activity, also has excellent durability and is low in the electric power generation cost as compared with noble metal catalysts, and they have completed the present invention.

It is needless to say that a polymer electrolyte fuel cell having the catalyst has excellent performance and is low in the electric power generation cost as compared with the conventional fuel cells.

The graphitized carbon powder in the present invention is a powder wherein carbon of carbon black as a raw material of the powder, said carbon having a primary particle diameter of about several nm to 100 nm, is partially aggregated, and therefore, also after the graphitization, carbon having this primary particle diameter remains aggregated. Accordingly, also the primary particle diameter of the carbon powder is preferably not more than 100 nm.

Moreover, it is preferable to use the graphitized carbon powder of the present invention together with fibrous carbon.

From the viewpoints of improvement in long-term durability, etc., it is more preferable that a carbon powder obtained by mixing, as the fibrous carbon, vapor grown carbon fibers in an amount of 1% by mass to 7% by mass based on the carbon powder and heat-treating the mixture at not lower than 2500° C. to graphitize the carbon powder is used in the fuel cell catalyst of the present invention. As the vapor grown carbon fibers, any of vapor grown carbon fibers may be used. For example, VGCF (registered trademark) available from Showa Denko K.K. is used.

The vapor grown carbon fibers can be prepared by subjecting a gas such as hydrocarbon to vapor phase thermal cracking in the presence of a metal-based catalyst. The graphitization of them can be accomplished by, for example, heat-treating them at a temperature of not lower than 2500° C. From the viewpoints of improvement in conductivity, etc., it is more preferable that a boron compound (e.g., boron carbide ($B_4C$), boron oxide or boron nitride) is mixed with the fibers and the mixture is heat-treated. The boron compound is preferably added in such an amount that the boron content in the fibers becomes 0.01 to 5% by mass. Details are described in JP 1985-27700 A, JP 1985-54998 A, JP 2,778,434 B, etc.

Active Substance

It is important that the niobium oxycarbonitride that acts as an active substance in the catalyst of the present invention is represented by the compositional formula $NbC_xN_yO_z$ (wherein x, y and z represent a ratio of the number of atoms and are numbers satisfying the conditions of $0.01 < x \leq 2$ (lower limit of x is, for example, 0.0105), $0.01 \leq y \leq 2$, $0.01 \leq z \leq 3$ and $x+y+z \leq 5$) and that when the niobium oxycarbonitride is subjected to powder X-ray diffractometry (Cu—Kα rays), two or more diffraction peaks are observed between a diffraction angle 2θ of 33° and that of 43°. It is also important that the main crystal structure is such a structure that a peak is assigned to $Nb_{12}O_{29}$.

That is to say, when the amount of carbon, the amount of nitrogen and the amount of oxygen in the niobium oxycarbonitride are in the above ranges, the niobium oxycarbonitride has excellent catalytic activity. Further, when the pattern in the powder X-ray diffractometry is the above pattern, the niobium oxycarbonitride has excellent catalytic activity.

From the fact that a peak assigned to $Nb_{12}O_{29}$ is observed when the niobium oxycarbonitride is subjected to X-ray diffractometry, it is presumed that carbon or nitrogen has been replaced with oxygen at the lattice site of oxygen or the structure of the carbonitride is a structure in which $Nb_{12}O_{29}$ and the carbonitride combine with each other. However, a simple carbonitride cannot be clearly isolated by the X-ray diffractometry. On the other hand, by the use of only $Nb_{12}O_{29}$ as a catalytically active substance, high activity is not obtained.

Another metal, such as iron, a transition metal or a rare earth metal, may be added to the niobium oxycarbonitride, or a niobium oxycarbonitride wherein apart of niobium has been replaced with another metal may be used.

Processes for producing the niobium oxycarbonitride are described below, but the processes are not limited to the below-described processes. For example, there can be mentioned a process comprising heat-treating a compound containing niobium and carbon in nitrogen to prepare a niobium carbonitride and then heat-treating the niobium carbonitride in an inert gas containing oxygen to obtain a niobium oxycarbonitride.

Examples of the processes for obtaining a niobium carbonitride that is used in the above process include a production process (I) comprising heat-treating a mixture of a niobium oxide and carbon in a nitrogen atmosphere to produce a niobium carbonitride, a production process (II) comprising heat-treating a mixture of a niobium carbide, a niobium oxide and a niobium nitride in a nitrogen atmosphere or the like to produce a niobium carbonitride, and a production process (III) comprising heat-treating a mixture of a niobium carbide and a niobium nitride in a nitrogen atmosphere or the like to produce a niobium carbonitride. In the present invention, any of these production processes may be used.

Production Process (I)

The production process (I) is a process comprising heat-treating a mixture of a niobium oxide and carbon in a nitrogen atmosphere to produce a niobium carbonitride.

The temperature of the heat treatment in the production of the niobium carbonitride is in the range of 600 to 1800° C., preferably 800 to 1600° C. When the heat treatment temperature is in the above range, crystallizability and homogeneity are good, so that such a heat treatment temperature is preferable. If the heat treatment temperature is lower than 600° C., crystallizability is bad, and homogeneity tends to become poor. If the heat treatment temperature exceeds 1800° C., sintering tends to occur.

Examples of the niobium oxides as raw materials include NbO, $NbO_2$ and $Nb_2O_5$. The niobium oxide as a raw material is not specifically restricted. Even if any niobium oxide is used, a catalyst comprising a niobium oxycarbonitride obtained by heat-treating the niobium carbonitride obtained from the oxide in an inert gas containing oxygen has a high oxygen reduction onset potential and has activity.

Examples of carbons as raw materials include carbon, carbon black, graphite, graphite, activated carbon, carbon nanotube, carbon nanofiber, carbon nanohorn and fullerene. The particle diameter of the carbon powder is preferably smaller because the carbon powder comes to have a larger specific surface area and readily reacts with the oxide. For example, carbon black (specific surface area: 100 to 300 $m^2/g$, e.g., trade name: VULCAN (registered trademark) XC-72 available from Cabot Corporation) is favorably used.

By stoichiometrically controlling the molar ratio between the niobium oxide and carbon as raw materials according to the valence of niobium, e.g., a valence of 2, 4 or 5, an appropriate niobium carbonitride is obtained. For example, in the case of an oxide of divalent niobium, the amount of carbon is preferably in the range of 1 to 3 mol based on 1 mol of the niobium oxide. In the case of an oxide of tetravalent niobium, the amount of carbon is preferably in the range of 2 to 4 mol based on 1 mol of the niobium oxide. In the case of an oxide of pentavalent niobium, the amount of carbon is preferably in the range of 3 to 9 mol based on 1 mol of the niobium oxide. If the molar ratio exceeds the upper limits of the above ranges, a niobium carbide tends to be formed. If the molar ratio is less than the lower limits of the above ranges, a niobium nitride tends to be formed.

Production Process (II)

The production process (II) is a process comprising heat-treating a mixture of a niobium carbide, a niobium oxide and a niobium nitride in a nitrogen atmosphere or the like to produce a niobium carbonitride.

The temperature of the heat treatment in the production of the niobiumcarbonitride is in the range of 600 to 1800° C., preferably 800 to 1600° C. When the heat treatment temperature is in the above range, crystallizability and homogeneity are good, so that such a heat treatment temperature is preferable. If the heat treatment temperature is lower than 600° C., crystallizability is bad, and homogeneity tends to become poor. If the heat treatment temperature exceeds 1800° C., sintering tends to occur.

As raw materials, a niobium carbide, a niobium nitride and a niobium oxide are used.

Examples of the niobium oxides as the raw materials include NbO, $NbO_2$ and $Nb_2O_5$. The niobium oxide as the raw material is not specifically restricted. Even if any niobium oxide is used, a catalyst comprising a niobium oxycarbonitride obtained by heat-treating the niobium carbonitride obtained from the oxide, the niobium carbide and the niobium nitride in an inert gas containing oxygen has a high oxygen reduction onset potential and has activity.

By controlling the amounts of (molar ratio) of the niobium carbide, the niobium oxide and the niobium nitride, an appropriate niobium carbonitride is obtained. Generally, based on 1 mol of the niobium nitride, the amount (molar ratio) of the niobium carbide is in the range of 0.01 to 500 mol, and the amount (molar ratio) of the niobium oxide is in the range of 0.01 to 50 mol, and preferably, based on 1 mol of the niobium nitride, the amount (molar ratio) of the niobium carbide is in the range of 0.1 to 300 mol, and the amount (molar ratio) of the niobium oxide is in the range of 0.1 to 30 mol. When a niobium carbonitride prepared in a molar ratio of the above range is used, a niobium oxycarbonitride having a high oxygen reduction onset potential and having activity tends to be obtained.

Production Process (III)

The production process (III) is a process heat-treating a mixture of a niobium carbide and a niobium nitride in a nitrogen atmosphere or the like to produce a niobium carbonitride.

The temperature of the heat treatment in the production of the niobiumcarbonitride is in the range of 600 to 1800° C., preferably 800 to 1600° C. When the heat treatment temperature is in the above range, crystallizability and homogeneity are good, so that such a heat treatment temperature is preferable. If the heat treatment temperature is lower than 600° C., crystallizability is bad, and homogeneity tends to become poor. If the heat treatment temperature exceeds 1800° C., sintering tends to occur.

Step of Producing a Niobium Oxycarbonitride

Next, a step (I) of heat-treating the niobium carbonitride in an inert gas containing oxygen to obtain a niobium oxycarbonitride and a step (II) of heat-treating the niobium oxycarbonitride in an inert gas to crystallize the niobium oxycarbonitride are described.

Step (I)

Examples of inert gases include nitrogen gas, helium gas, neon gas, argon gas, krypton gas, xenon gas or radon gas. Nitrogen gas or argon gas are particularly preferable because they are relatively easily obtainable.

Although the oxygen concentration in this step depends upon the heat treatment time and the heat treatment temperature, it is preferably in the range of 0.1 to 10% by volume, particularly preferably 0.1 to 5% by volume. When the oxygen concentration is in the above range, a homogeneous oxycarbonitride is formed, therefore such an oxygen concentration is preferable. If the oxygen concentration is not more than 0.1% by volume, the resulting product tends to be in a non-oxidized state.

The temperature of the heat treatment in this step is preferably in the range of 400 to 1400° C. in which amorphous niobium oxycarbonitride is formed. When the heat treatment temperature is in the above range, a homogeneous oxycarbonitride is formed, so that such a temperature is preferable. If the heat treatment temperature is lower than 400° C., oxidation tends to be not promoted.

In this step, the inert gas may contain hydrogen, and the hydrogen concentration is preferably in the range of 0.1 to 10% by volume though it depends upon the heat treatment time and the heat treatment temperature. When the hydrogen concentration is in the range of 0.5 to 5% by volume, a homogeneous oxycarbonitride is formed, therefore such a hydrogen concentration is particularly preferable. If the hydrogen concentration exceeds 10% by volume, reduction tends to proceed excessively.

Step (II)

The inert gas is as described in the step (I).

The crystallizability of the oxycarbonitride in this step depends upon the heat treatment time and the heat treatment temperature, and the heat treatment temperature is preferably in the range of 800 to 1400° C. in which crystal growth proceeds sufficiently. When the heat treatment temperature is in the above range, crystallization proceeds, therefore such a temperature is preferable. For example, when niobium is used as the metal, the heat treatment temperature is preferably in the range of 800 to 1400° C.

Examples of the heat treatment methods in this step include a standing method, a stirring method, a dropping method and a powder capturing method.

The standing method is a method wherein a carbonitride of a transition metal is placed in a stationary electric furnace or the like and subjected to heat treatment. An alumina board or a quartz board on which a carbonitride of a transition metal is weighed may be placed in the furnace and subjected to heat treatment. The standing method is advantageous in that a large amount of a carbonitride of a transition metal can be heat-treated.

The stirring method is a method wherein a carbonitride of a transition metal is placed in an electric furnace such as a rotary kiln and subjected to heat treatment while stirring the carbonitride. The stirring method is advantageous in that a large amount of a carbonitride of a transition metal can be heat-treated and aggregation and growth of particles of the carbonitride of a transition metal can be inhibited.

In the case where the standing method or the stirring method is carried out using a tubular furnace, the time for the heat treatment of the carbonitride of a transition metal is in the range of 0.1 to 10 hours, preferably 0.5 hour to 5 hours. When the heat treatment time is in this range, a homogeneous oxycarbonitride tends to be formed, therefore such a heat treatment time is preferable. If the heat treatment time is less than 0.1 hour, an oxycarbonitride tends to be partially formed. If the heat treatment time exceeds 10 hours, oxidation tends to proceed excessively.

The dropping method is a method wherein an induction furnace is heated up to a predetermined heat treatment temperature while flowing an inert gas containing a trace amount of oxygen into the furnace, then a thermal equilibrium is maintained at the temperature, and thereafter a carbonitride of a transition metal is dropped into a crucible that is a heating zone of the furnace to perform heat treatment. The dropping method is advantageous in that aggregation and growth of particles of the carbonitride of a transition metal can be minimized.

In the dropping method, the time for the heat treatment of the carbonitride of a transition metal is in the range of usually 0.5 to 10 minutes, preferably 0.5 to 3 minutes. When the heat treatment time is in this range, a homogeneous oxycarbonitride tends to be formed, therefore such a heat treatment time is preferable. If the heat treatment time is less than 0.5 minute, an oxycarbonitride tends to be partially formed. If the heat treatment time exceeds 10 hours, oxidation tends to proceed excessively.

The powder capturing method is a method wherein niobium carbonitride is suspended as particles in an inert gas atmosphere containing a trace amount of oxygen and the carbonitride of a transition metal is captured in a vertical tubular furnace maintained at a predetermined heat treatment temperature and heat-treated therein.

In the powder capturing method, the time for the heat treatment of the carbonatiride of a transition metal is in the range of 0.2 second to 1 minute, preferably 0.2 to 10 seconds. When the heat treatment time is in this range, a homogeneous oxycarbonitride tends to be formed, therefore such a heat treatment time is preferable. If the heat treatment time is less than 0.2 second, an oxycarbonitride tends to be partially formed. If the heat treatment time exceeds 1 minute, oxidation tends to proceed excessively.

As the active substance in the catalyst of the present invention, the oxycarbonitride of a transition metal obtained by the aforesaid production process may be used as it is. However, finer particles obtained by crushing the resulting oxycarbonitride of a transition metal may be used.

Examples of methods for crushing niobium oxycarbonitride include methods using a roll mill, a ball mill, a medium stirring mill, an air flow crusher, a mortar and a crushing tank. From the viewpoint that the niobium oxycarbonitride can be crushed into finer particles, the method using an air flow crusher is preferable. From the viewpoint that crushing of a small amount of the niobium oxycarbonitride is facilitated, the method using a mortar is preferable.

When a titanium oxycarbonitride is used as the active substance, it is important that the titanium oxycarbonitride is represented by the compositional formula $TiC_xN_yO_z$ (wherein x, y and z represent a ratio of the number of atoms and are numbers satisfying the conditions of $0<x\leq1.00$ (lower limit of x is, for example, 0.0005), $0<y\leq1.00$ (lower limit of y is, for example, 0.0005), $0.1\leq z\leq3.0$, $1.0\leq x+y+z\leq5.0$ and $2.0\leq 4x+3y+2z$) and that when the titanium oxycarbonitride is subjected to powder X-ray diffractometry (Cu—Kα rays), a rutile-type crystal structure is observed.

When the main crystal structure of the titanium oxycarbonitride is a rutile type crystal structure, the titanium oxycarbonitride has excellent catalytic activity.

From the fact that a peak assigned to the rutile structure is observed when the titanium oxycarbonitride is subjected to X-ray diffractometry, it is presumed that carbon or nitrogen has been replaced with oxygen at the lattice site of oxygen or the structure of the carbonitride is a structure in which rutile type $TiO_2$ and the carbonitride combine with each other. However, a simple carbonitride cannot be clearly isolated by the X-ray diffractometry. On the other hand, by the use of only the rutile type $TiO_2$ as the catalytically active substance, high activity is not obtained. Another metal, such as iron, a transition metal or a rare earth metal, may be added to the titanium oxycarbonitride, or a titanium oxycarbonitride wherein a part of titanium has been replaced with another metal may be used.

As a process for preparing the titanium oxycarbonitride, a process wherein "niobium" of the niobium oxycarbonitride in the aforesaid process is replaced with "titanium" can be mentioned.

Catalyst

Next, an embodiment wherein a graphitized carbon powder is used as a support is described.

There is no specific limitation on the method to allow the carbon powder to support the niobium oxycarbonitride or the titanium oxycarbonitride that is a catalytically active substance. Examples of recommendable methods to disperse the active substance on the graphitized carbon powder that is a support include an air flow dispersion method and an in-liquid dispersion method. The in-liquid dispersion method is preferable because a dispersion of the catalyst and electron conductive particles in a solvent can be used in the step for forming a fuel cell catalyst layer. Examples of the in-liquid dispersion methods include a method using orifice-choked flow, a method using rotational shear flow method and a method using ultrasonic. The solvent used in the in-liquid dispersion method is not specifically restricted as far as the catalyst and the electron conductive particles are not corroded and can be dispersed therein. In general, a volatile liquid organic solvent, water or the like is used.

When the catalyst is dispersed on the electron conductive particles, an electrolyte and a dispersant may be dispersed together.

There is no specific limitation on the method to form a fuel cell catalyst layer. For example, a method in which a suspension comprising the catalytically active substance, the carbon powder and the electrolyte is applied on an electrolyte membrane or a gas diffusion layer can be mentioned. Examples of the application methods include dipping, screen printing, roll coating and spraying. Further, there can be also mentioned a method in which from a suspension comprising the catalyst, the electron conductive particles and the electrolyte, a fuel cell catalyst layer is formed on a base by application or filtration and then the fuel cell catalyst layer is transferred onto an electrolyte membrane.

The mass ratio between the active substance and the carbon powder (active substance:carbon powder) is preferably in the range of 1:1 to 1000:1, more preferably 1:1 to 500:1, most preferably 1:1 to 200:1.

The catalyst of the present invention preferably has an oxygen reduction onset potential, as measured versus a reversible hydrogen electrode by the following measurement method (A), of not less than 0.85 V (vs. NHE).

Measurement Method (A)

As an example, the catalytically active substance and the carbon powder are introduced in a solvent and ultrasonically stirred to obtain a suspension. As the solvent, a mixed solvent of isopropyl alcohol and water (isopropyl alcohol:water=2:1 by mass) is used.

With ultrasonication of the suspension, a 30 µl portion thereof is collected and is quickly dropped on a glassy carbon electrode (diameter: 5.2 mm) and dried at 120° C. for 1 hour to form a fuel cell catalyst layer containing the catalytically active substance on the glassy carbon electrode.

Subsequently, 10 µl of NAFION (registered trademark) (5% NAFION (registered trademark) solution (DE521) available from DuPont) diluted ten times with pure water is dropped on the fuel cell catalyst layer and is dried at 120° C. for 1 hour.

Using the electrode manufactured above, polarization is carried out in a 0.5 mol/dm³ sulfuric acid solution at 30° C. in an oxygen atmosphere or a nitrogen atmosphere at a potential scanning rate of 5 mV/sec, thereby recording a current-potential curve. As a reference electrode, a reversible hydrogen electrode in a sulfuric acid solution of the same concentration is used. In the current-potential curve, the potential at which the reduction current starts to differ by not less than 0.2 µA/cm² between the polarization in the oxygen atmosphere and that in the nitrogen atmosphere is obtained as the oxygen reduction onset potential.

If the oxygen reduction onset potential is less than 0.85V (vs. NHE), the use of the catalyst in a fuel cell cathode may cause the generation of hydrogen peroxide. On that account, the oxygen reduction onset potential is preferably not less than 0.85 V (vs. NHE) in order to favorably reduce oxygen. A higher oxygen reduction onset potential is more preferable. Although the upper limit of the oxygen reduction onset potential is not specifically determined, it is 1.23 V (vs. NHE) that is a theoretical value.

The fuel cell catalyst layer of the present invention formed by the use of the above catalyst is preferably used at a potential of not lower than 0.4 V (vs. NHE) in an acidic electrolyte, and the upper limit of the potential depends on the stability of the electrode. The fuel cell catalyst layer can be used at a potential of up to about 1.23 V (vs. NHE) which is a potential at which oxygen is generated.

If the potential is less than 0.4 V (vs. NHE), oxygen cannot be favorably reduced and usefulness of the fuel cell catalyst layer in a membrane electrode assembly of a fuel cell is poor, though there is no problem on the stability of the active substance.

Uses

The catalyst of the present invention can be used as a catalyst for a polymer electrolyte fuel cell.

By the use of the catalyst of the present invention, a fuel cell catalyst layer can be formed. The fuel cell catalyst layers include an anode catalyst layer and a cathode catalyst layer, and the catalyst may be used in any of them. Since the fuel cell catalyst layer of the present invention comprises a catalyst which has high oxygen reduction activity and is hardly corroded even at a high potential in an acidic electrolyte, it is useful as a catalyst layer (catalyst layer for cathode) provided on a cathode of a fuel cell.

The fuel cell catalyst layer is favorably used particularly as a catalyst layer provided on a cathode of a membrane electrode assembly in a polymer electrolyte fuel cell.

EXAMPLES

The present invention is described in more detail with reference to the following examples, but it should be construed that the present invention is in no way limited to those examples.

Various measurements in the examples and the comparative examples were carried out by the following methods.

Analytical Methods

1. Powder X-ray diffractometry

Samples were analyzed by powder X-ray diffractometry using Rotaflex manufactured by Rigaku Denki Co., Ltd.

In the powder X-ray diffractometry of each sample, the number of diffraction peaks was counted in a manner such that a signal which could be detected with a signal (S) to noise (N) ratio (S/N) of not less than 2 was regarded as one peak. The noise (N) was the width of the baseline.

2. Elemental Analysis

Carbon: About 0.01 g of a sample was weighed out and analyzed by a carbon sulfur analytical device (EMIA-920V manufactured by Horiba, Ltd.)

Heating method: high-frequency heating, Combustion additive: 1.5 g of W and 0.2 g of Sn, Converter level: 1%, Standard sample: carbon standard sample for steel Nitrogen, Oxygen: About 0.01 g of a sample was weighed out, encapsulated in a Ni capsule and analyzed by an oxygen nitrogen analyzer (TC600 manufactured by LECO Corporation).

Heating method: resistance furnace heating (5500 w), Combustion additive: none, Standard sample: standard sample supplied by LECO Corporation.

Metal (niobium, titanium, cerium, iron): About 0.1 g of a sample was weighed into a quartz beaker, and the sample was completely thermally decomposed by the use of sulfuric acid, nitric acid and hydrofluoric acid. After cooling, the volume of the resulting solution was fixed to 100 ml. The solution was appropriately diluted, and quantitative determination was carried out by the use of ICP-OES (VISTA-PRO manufactured by SII) or ICP-MS (HP7500 manufactured by Agilent).

3. Measurement of mean particle diameter

In an equivalent sphere distribution measured by a centrifugal sedimentation type particle size distribution analyzer (SA-CP4L model) manufactured by Shimadzu Corporation, the particle diameter in the case of an integrated volume fraction of 50% obtained by integration from the larger particle side was regarded as a mean particle diameter (d50).

Example 1

1. Preparation of Catalytically Active Substance 2.60 g (21 mmol) of niobium (IV) oxide ($NbO_2$) (available from Kojundo Chemical Laboratory Co., Ltd., purity: 99.9%) was mixed with 600 mg (50 mmol) of sufficiently crushed carbon (available from Cabot Corporation, VULCAN (registered trademark) XC-72 (mean particle diameter: 30 nm)). This mixed powder was heated in a tubular furnace at 1600° C. for 1 hour in a nitrogen atmosphere, whereby 2.55 g of niobium carbonitride was obtained.

In a tubular furnace, 2.00 g of the resulting niobium carbonitride was heated at 900° C. for 3 hours while flowing argon gas containing 1% by volume of oxygen gas and 2% by volume of hydrogen gas into the furnace, whereby 2.15 g of a niobium oxycarbonitride was obtained. The results of powder X-ray diffraction of the resulting catalytically active substance are shown in FIG. 1. With regard to the composition of the niobium oxycarbonitride ($NbC_xN_yO_z$), x, y and z proved to be 0.48, 0.15 and 1.29, respectively, from the results of the elemental analysis, and x+y+z was 1.92.

2. Preparation of Carbon Powder

As raw material carbon black, furnace black (available from Cabot Corporation, VULCAN (registered trademark) XC-72) was used. 3.0% by mass of a boron carbide powder (available from Kojundo Chemical Laboratory Co., Ltd., purity: 99%) having a mean particle diameter of about 0.5 µm, which had been crushed in advance, was added to 100% by mass of this furnace black, and they were mixed by the use of a lab-mixer manufactured by Hosokawa Micron Corporation to give a sample. Heat treatment of the sample was carried out by placing the sample in a graphite box, setting the box in an Acheson furnace and keeping it at 2800° C. for 5 minutes. After the heat treatment, the sample was cooled down to ordinary temperature in a non-oxidizing atmosphere and crushed by the aforesaid lab-mixer.

Thereafter, the C0 value was measured by X-ray diffraction, and from the voltage drop at 2 MPa, a volume specific resistance value was calculated. The volume resistance was determined in the following manner. Electric current terminals made of copper plate were set on both surfaces of a powder sample placed in a resin cell, then while applying a pressure to the powder sample to compress the powder, a voltage between two terminals (distance: 2 cm) for voltage measurement inserted through the bottom of the container was read, and a resistance value (R) (Ω·cm) was calculated from the following formula.

$$R(\Omega\cdot cm) = (E/0.1) \times D(cm^2)/2 \text{ (cm)}$$

Here, D is a sectional area (depth× width) of the powder in the current direction.

As a result, C0 was 0.6715 nm, and a consolidation resistance was 74 mΩ·cm.

3. Preparation of Fuel Cell Electrode

An electrode for the measurement of oxygen reduction activity was fabricated 3 in the following manner. The catalytically active substance in an amount of 0.095 g and the carbon powder in an amount of 0.005 g were added to 10 g of a solution obtained by mixing isopropyl alcohol and pure water in a mixing ratio of 2:1 (isopropyl alcohol:pure water), and they were ultrasonically stirred, suspended and mixed. Then, 30 μl of the mixture was applied to a glassy carbon electrode (manufactured by Tokai Carbon Co., Ltd., diameter: 5.2 mm) and dried at 120° C. for 1 hour. Further, 10 μl of NAFION (registered trademark) (5% NAFION (registered trademark) solution (DE521) available from DuPont) diluted ten times with pure water was applied thereon and dried at 120° C. for 1 hour to obtain a fuel cell electrode.

4. Evaluation of Oxygen Reduction Activity

Catalytic performance (oxygen reduction activity) of the fuel cell electrode fabricated as above was evaluated in the following manner.

First, the fuel cell electrode fabricated was subjected to polarization in a sulfuric acid aqueous solution of 0.5 mol/dm$^3$ (mol/L) at 30° C. in an oxygen atmosphere or a nitrogen atmosphere at a potential scanning rate of 5 mV/sec, thereby recording a current-potential curve. As a reference electrode, a reversible hydrogen electrode in a sulfuric acid solution of the same concentration was used.

In the above measurement results, the potential at which the reduction current started to differ by not less than 0.2 μA/cm$^2$ between the polarization in the oxygen atmosphere and that in the nitrogen atmosphere was obtained as the oxygen reduction onset potential. The difference between the reduction currents was obtained as the oxygen reduction current.

The catalytic performance (oxygen reduction ability) of the fuel cell electrode fabricated above was evaluated by the oxygen reduction onset potential and the oxygen reduction current.

In detail, as the oxygen reduction onset potential rises or as the oxygen reduction current increases, the catalytic performance (oxygen reduction activity) of the fuel cell electrode becomes higher.

Figure 2:
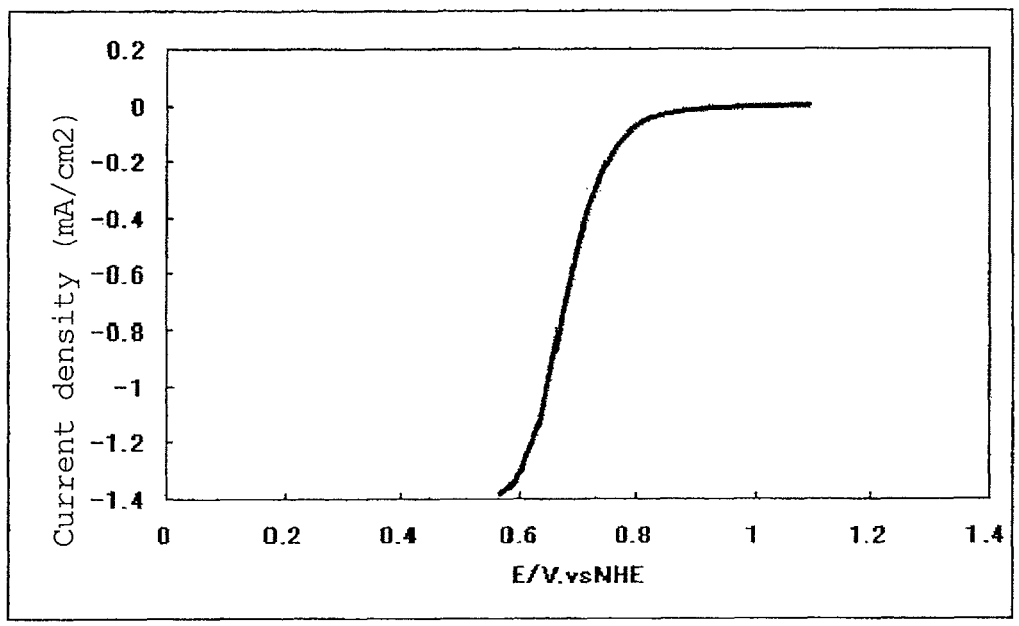
FIG. 2 shows a current-potential curve of Example 1.

In FIG. 2, a current-potential curve obtained by the above measurement is shown.

The fuel cell electrode fabricated above had an oxygen reduction onset potential of 0.95 V (vs. NHE) and had an oxygen reduction current density of 0.47 (mA/cm$^2$) at a potential of 0.7 V. Thus the fuel cell electrode was found to have high oxygen reduction activity.

5. Evaluation of Durability

In the same sulfuric acid aqueous solution as used for the electrode evaluation in the example except for having a liquid temperature of 80° C., the same electrode as used in the above evaluation was held for 1000 hours at an electrode potential of 1.2 V. Thereafter, the oxygen reduction onset potential and the oxygen reduction current at a potential of 0.7 V were measured again at 25° C. As a result, the oxygen reduction onset potential was 0.95 V, and the oxygen reduction current at a potential of 0.7 V was 0.46 (mA/cm$^2$), thus they little changed.

Example 2

1. Preparation of catalytically active substance 5.10 g (85 mmol) of titanium carbide (TiC) (Soekawa Chemical Co., Ltd., purity: 99%), 0.80 g (10 mmol) of titanium oxide (TiO$_2$) (Kojundo Chemical Laboratory Co., Ltd., purity: 99.9%) and 0.31 g (5 mmol) of titaniumnitride (TiN) (SoekawaChemical Co., Ltd., purity: 99%) were well mixed and heated at 1800° C. for 3 hours in a nitrogen atmosphere, whereby 5.73 g of a titanium carbonitride was obtained. Because the titanium carbonitride was sintered, it was crushed by an automatic mortar.

In a tubular furnace, 298 mg of the resulting titanium carbonitride was heated at 1000° C. for 10 hours while flowing nitrogen gas containing 1% by volume of oxygen gas and 4% by volume of hydrogen gas into the furnace, whereby 393 mg of a titanium oxycarbonitride was obtained.

From the results of the elemental analysis of the resulting titanium oxycarbonitride (TiC$_x$N$_y$O$_z$), x, y and z proved to be 0.12, 0.05 and 1.71, respectively, and x+y+z was 1.88.

Figure 3:
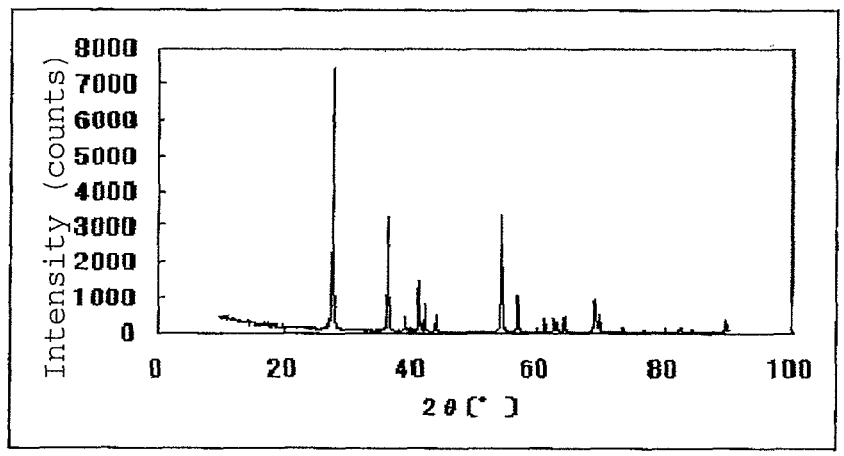
FIG. 3 shows a powder X-ray diffraction spectrum of a catalytically active substance of Example 2.

A powder X-ray diffraction spectrum of the resulting catalytically active substance is shown in FIG. 3.

2. Preparation of Carbon Powder

As raw material carbon black, acetylene black (available from Denki Kagaku Kogyo K.K., trade name : Denka Black (registered trademark) (mean particle diameter: 35 nm, specific surface area: 68 m$^2$/g)) was used. 4.0% by mass of a boron carbide powder having a mean particle diameter of about 20 μm, which had been crushed in advance, was added to 100% by mass of this acetylene black, and they were mixed by the use of a lab-mixer manufactured by Hosokawa Micron Corporation to give a sample. Heat treatment of the sample was carried out by placing the sample in a graphite box, setting the box in an Acheson furnace and keeping it at 2700° C. for 5 minutes. After the heat treatment, the sample was cooled down to ordinary temperature in a non-oxidizing atmosphere and crushed by the aforesaid lab-mixer.

The C0 value measured by X-ray diffraction was 0.6719, and the volume specific resistance value calculated from the voltage drop at 2 MPa was 50 mΩ.cm.

3. Preparation of Fuel Cell Electrode and Evaluation of Oxygen Reduction Activity An electrode for the measurement of oxygen reduction activity was fabricated in the same manner as in Example 1, except that the active substance and the carbon powder prepared by the above methods were used. Further, the oxygen reduction activity was evaluated in the same manner as in Example 1.

Figure 4:
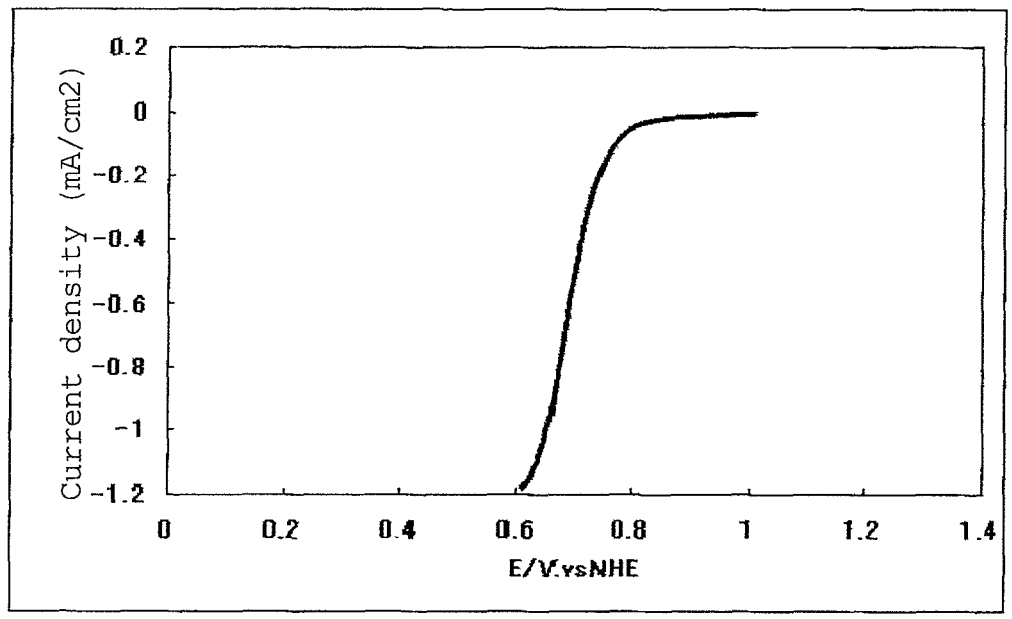
FIG. 4 shows a current-potential curve of Example 2.

The results are shown in FIG. 4. The oxygen reduction onset potential was 0.94V (vs. NHE), and the oxygen reduction current density at a potential of 0.7 V was 0.52 (mA/cm$^2$). Thus the fuel cell electrode was found to have high oxygen reduction activity.

4. Evaluation of Durability

In the same sulfuric acid aqueous solution as used for the electrode evaluation in the example except for having a liquid temperature of 80° C., the same electrode as used in the above evaluation was held for 1000 hours at an electrode potential of 1.2 V. Thereafter, the oxygen reduction onset potential and the oxygen reduction current at a potential of 0.7 V were measured again at 25° C. As a result, the oxygen reduction onset potential was 0.91 V, and the oxygen reduction current at a potential of 0.7 V was 0.52 (mA/cm$^2$).

Example 3

1. Preparation of Catalytically Active Substance 5.88 g (56 mmol) of niobium carbide (NbC) (Kojundo Chemical Laboratory Co., Ltd., purity: 99%), 0.40 g (2.5 mmol) of ferric oxide (Kojundo Chemical Laboratory Co., Ltd., purity: 99.9%) and 5.12 g (48 mmol) of niobium nitride (NbN) (Kojundo Chemical Laboratory Co., Ltd., purity:

99%) were sufficiently crushed and mixed. This mixed powder was heat-treated in a tubular furnace at 1600° C. for 3 hours in a nitrogen atmosphere, whereby 11.18 g of a carbonitride containing iron and niobium was obtained. This sintered carbonitride was crushed by a ball mill.

In a tubular furnace, 1.00 g of the resulting carbonitride was heated at 900° C. for 6 hours while flowing nitrogen gas containing 1% by volume of oxygen gas and 2.0% of hydrogen gas into the furnace, whereby 1.25 g of an oxycarbonitride containing iron (5% by mol) and niobium was obtained. From the results of the elemental analysis of the resulting oxycarbonitride of niobium and iron ($Nb_aFe_bC_xN_yO_z$), a, b, x, y and z proved to be 0.95, 0.05, 0.45, 0.15 and 1.35, respectively, and x+y+z was 1.95.

Figure 5:
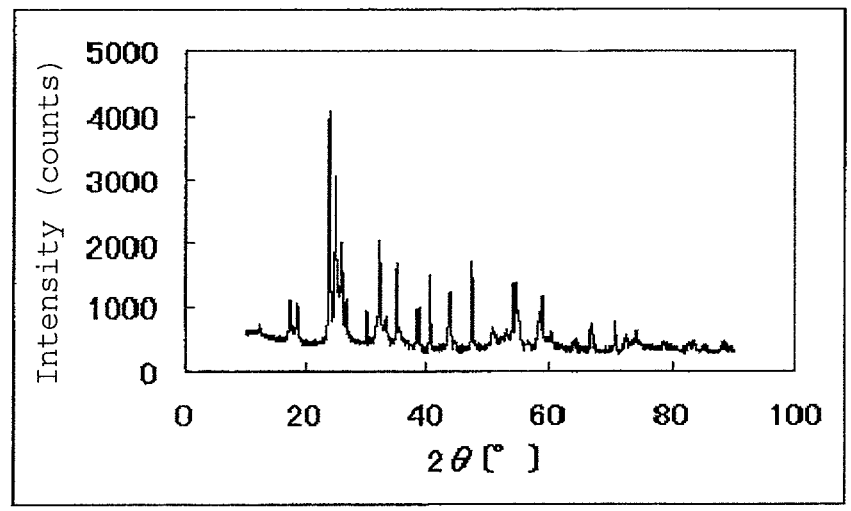
FIG. 5 shows a powder X-ray diffraction spectrum of a catalytically active substance of Example 3.

A powder X-ray diffraction spectrum of the catalytically active substance is shown in FIG. 5. Between a diffraction angle 2θ of 33° and that of 43°, four diffraction peaks were observed.

2. Preparation of Carbon Powder

As raw material carbon black, furnace black (available from Lion Corporation, trade name: Ketjen Black (registered trademark) EC-600JD (mean particle diameter: 34 nm, specific surface area: 1270 $m^2/g$)) was used. This furnace black was placed in a graphite box, and the box was set in an Acheson furnace and kept at 2990° C. for 5 minutes. After the heat treatment, the sample was cooled down to ordinary temperature in a non-oxidizing atmosphere and crushed by the aforesaid lab-mixer.

The C0 value measured by X-ray diffraction was 0.6711, and the volume specific resistance value calculated from the voltage drop at 2 MPa was 38 mΩ·cm.

3. Preparation of Fuel Cell Electrode and Evaluation of Oxygen Reduction Activity An electrode for the measurement of oxygen reduction activity was fabricated in the same manner as in Example 1, except that the active substance and the carbon powder prepared by the above methods were used. Further, the oxygen reduction activity was evaluated in the same manner as in Example 1.

Figure 6:
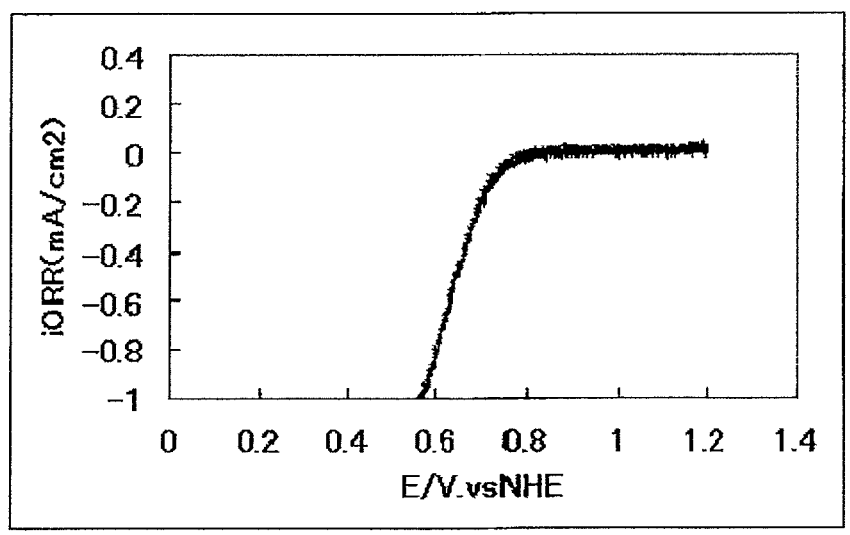
FIG. 6 shows a current-potential curve of Example 3.

The results are shown in FIG. 6. The oxygen reduction onset potential was 0.95 V (vs. NHE), and the oxygen reduction current density at a potential of 0.7 V was 0.56 ($mA/cm^2$). Thus the fuel cell electrode was found to have high oxygen reduction activity.

4. Evaluation of Durability

In the same sulfuric acid aqueous solution as used for the electrode evaluation in the example except for having a liquid temperature of 80° C., the same electrode as used in the above evaluation was held for 1000 hours at an electrode potential of 1.2 V. Thereafter, the oxygen reduction onset potential and the oxygen reduction current at a potential of 0.7 V were measured again at 25° C. As a result, the oxygen reduction onset potential was 0.94 V, and the oxygen reduction current at a potential of 0.7 V was 0.55 ($mA/cm^2$).

Example 4

1. Preparation of Catalytically Active Substance 2.87 g (35.9 mmol) of titanium oxide ($TiO_2$) (Kojundo Chemical Laboratory Co., Ltd., purity: 99.9%) and 0.28 g (1.6 mmol) of cerium oxide ($CeO_2$) (Kojundo Chemical Laboratory Co., Ltd., purity: 99.9%) were mixed with 1.2 g (100 mmol) of sufficiently crushed carbon (available from Cabot Corporation, VULCAN (registered trademark) 72). This mixed powder was heat-treated in a tubular furnace at 1800° C. for 3 hours in a nitrogen atmosphere, whereby 2.98 g of a carbonitride containing cerium (4.2% by mol) and titanium was obtained.

In a tubular furnace, 1.02 g of the resulting carbonitride was heat-treated at 1000° C. for 1 hour while flowing nitrogen gas containing 1% by volume of oxygen gas and 2.0% by volume of hydrogen gas into the furnace, whereby 1.09 g of an oxycarbonitride containing cerium (4% by mol) and titanium was obtained. From the results of the elemental analysis of the titanium oxycarbonitride and cerium ($Ti_aCe_bC_xN_yO_z$), a, b, x, y and z proved to be 0.96, 0.04, 0.35, 0.12 and 1.25, respectively, and x+y+z was 1.72.

Figure 7:
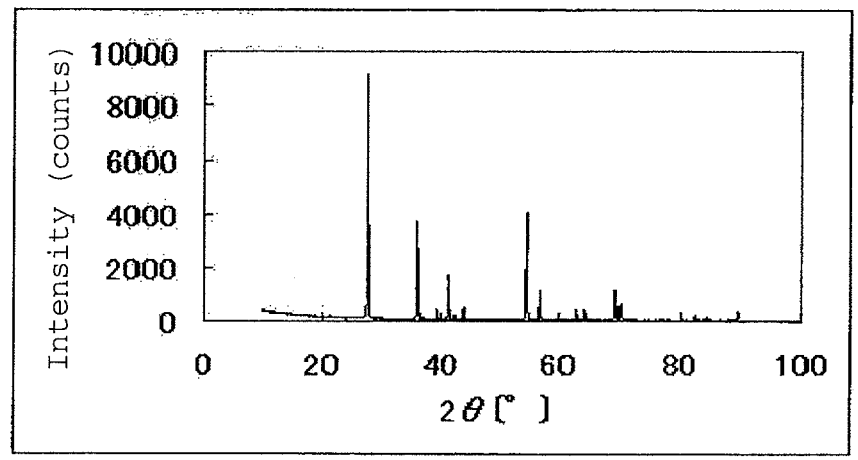
FIG. 7 shows a powder X-ray diffraction spectrum of a catalytically active substance of Example 4.

A powder X-ray diffraction spectrum of the resulting catalytically active substance is shown in FIG. 7.

2. Preparation of Carbon Powder

Using, as raw material carbon black, quite the same furnace black as used in Example 1, a carbon powder was prepared in the same manner as in Example 1.

3. Preparation of Fuel Cell Electrode and Evaluation of Oxygen Reduction Activity An electrode for the measurement of oxygen reduction activity was fabricated in the same manner as in Example 1, except that the active substance and the carbon powder prepared by the above methods were used. Further, the oxygen reduction activity was evaluated in the same manner as in Example 1.

Figure 8:
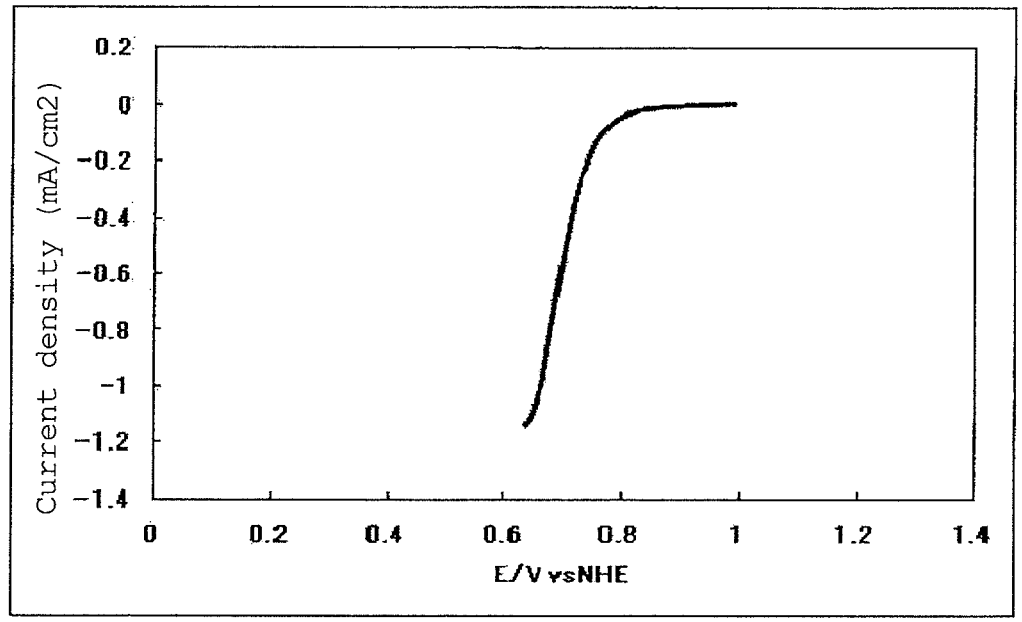
FIG. 8 shows a current-potential curve of Example 4.

The results are shown in FIG. 8. The oxygen reduction onset potential was 0.94 V (vs. NHE), and the oxygen reduction current density at a potential of 0.7 V was 0.61 ($mA/cm^2$). Thus the fuel cell electrode was found to have high oxygen reduction activity.

In the same sulfuric acid aqueous solution as used for the electrode evaluation in the example except for having a liquid temperature of 80° C., the same electrode as used in the above evaluation was held for 1000 hours at an electrode potential of 1.2 V. Thereafter, the oxygen reduction onset potential and the oxygen reduction current at a potential of 0.7 V were measured again at 25° C. As a result, the oxygen reduction onset potential was 0.85 V, and the oxygen reduction current at a potential of 0.7 V was 0.60 ($mA/cm^2$).

Example 5

A catalytically active substance prepared in the same manner as in Example 1 was crushed into particles having a mean particle diameter of 30 nm by a ball mill. 30% by mass of the active substance, 1.5 g of a carbon powder prepared in quite the same manner as in Example 1, 10 g of a concentrated solution of a 5 mass % solution of NAFION (registered trademark) (5% NAFION (registered trademark) solution (DE521) available from DuPont) and 5 g of distilled water were mixed by a ball mill for 30 minutes to obtain a paste. This paste was applied on a gas diffusion layer composed of a carbon sheet (carbon sheet available from Toray Industries, Inc.: EC-TP1-060T) having been treated with 30% by mass of water-repellent resin polytetrafluoroethylene, then dried at 60° C. for 10 minutes and heated at 130° C. for 1 minute at 200 $N/cm^2$, whereby a gas diffusion electrode having a catalyst layer supporting 1 $mg/cm^2$ of the catalytically active substance was fabricated as a cathode. As an anode, an electrode fabricated in the same manner as above using the same amounts as above except for using platinum instead of the above catalytically active substance was used. An ion exchange membrane (available from DuPont, trade name: NAFION (registered trademark)) was interposed between the cathode and the anode, and the current was collected at both ends to form a single cell of a polymer electrolyte fuel cell.

By the maximum output value obtained when this single cell was operated and under a pressure of 10 N/cm² of oxygen gas and hydrogen gas as a fuel gas, cell properties of the polymer electrolyte fuel cell were evaluated.

As a result, the maximum output was 0.26 W/cm². The supposed cost of the raw material Nb compound used for this cathode is about 50 yen/g, and the cost unit requirement based on 1 g of the cathode active substance is about 5.2 W/yen.

Example 6

1. Preparation of Catalytically Active Substance

A catalytically active substance prepared in the same manner as in Example 3 was used.

2. Preparation of Carbon Powder 3.0% by mass of a boron carbide powder (Kojundo Chemical Laboratory Co., Ltd., purity: 99%) having a mean particle diameter of about 0.5 μm, which had been crushed in advance, and VGCF (registered trademark) (available from Show Denko K.K.) (mean particle diameter: 150 nm, specific surface area: 13 m²/g) as vapor grown carbon fibers were added to 100% by mass of furnace carbon (available from Cabot Corporation, trade name: VULCAN (registered trademark) X-72) as raw material carbon black, and they were mixed by the use of a lab-mixer manufactured by Hosokawa Micron Corporation to give a sample. Thereafter, graphitization was carried out in the same manner as in Example 1 to prepare a carbon powder. The C0 value measured by X-ray diffraction was 0.6711, and the volume specific resistance value calculated from the voltage drop at 2 MPa was 51 mΩ·cm.

3. Preparation of Fuel Cell Electrode and Evaluation of Oxygen Reduction Activity An electrode for the measurement of oxygen reduction activity was fabricated in the same manner as in Example 1, except that the active substance and the carbon powder prepared by the above methods were used. Further, the oxygen reduction activity was evaluated in the same manner as in Example 1.

The oxygen reduction onset potential was 0.95V (vs. NHE), and the oxygen reduction current density at a potential of 0.7 V was 0.50 (mA/cm²). Thus the fuel cell electrode was found to have high oxygen reduction activity.

4. Evaluation of Durability

In the same sulfuric acid aqueous solution as used for the electrode evaluation in the example except for having a liquid temperature of 80° C., the same electrode as used in the above evaluation was held for 1000 hours at an electrode potential of 1.2 V. Thereafter, the oxygen reduction onset potential and the oxygen reduction current at a potential of 0.7 V were measured again at 25° C. As a result, the oxygen reduction onset potential was 0.94 V, and the oxygen reduction current at a potential of 0.7 V was 0.50 (mA/cm²).

Comparative Example 1

Using the same catalytically active substance as used in Example 1, fabrication of an electrode was carried out in quite the same manner as in Example 1, except that commercially available furnace black (available from Lion Corporation, trade name: Ketjen Black (registered trademark) EC-600JD) was used as it was as a carbon powder. Evaluation of the oxygen reduction activity was carried out in quite the same manner as in Example 1.

Figure 9:
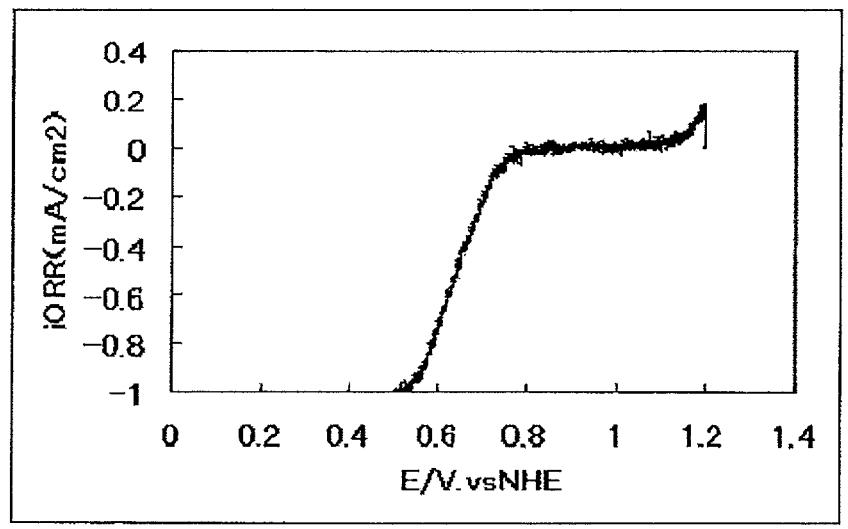
FIG. 9 shows a current-potential curve of Comparative Example 1.

As a result, the oxygen reduction onset potential was 0.95V (vs. NHE), as shown in FIG. 9, and the oxygen reduction current density at a potential of 0.7 V was 0.54 (mA/cm²). However, in the evaluation of durability after holding of the electrode at 80° C. for 2000 hours at a potential of 1.2 V, the oxygen reduction onset potential dropped to 0.55 V, and the oxygen reduction current at a potential of 0.7 V could not be measured.

Comparative Example 2

Using the same catalyst as used in Example 3, fabrication of an electrode was carried out in quite the same manner as in Example 3, except that commercially available acetylene black (available from Denki Kagaku Kogyo K.K., trade name: DenkaBlack (registered trademark) (mean particle diameter: 35 nm, specific surface area: 68 m²/g)) was used as a carbon powder. Evaluation of the oxygen reduction activity was carried out in quite the same manner as in Example 3.

As a result, the oxygen reduction onset potential was 0.94V (vs. NHE), and the oxygen reduction current density at a potential of 0.7 V was 0.53 (mA/cm²). However, in the evaluation of durability after holding of the electrode at 80° C. for 2000 hours at a potential of 1.2 V, the oxygen reduction onset potential dropped to 0.53 V, and the oxygen reduction current at a potential of 0.7V could not be measured.

Comparative Example 3

Using the same catalyst as used in Example 3, fabrication of an electrode was carried out in quite the same manner as in Example 3, except that commercially available furnace black (available from Cabot Corporation, trade name: VULCAN (registered trademark) X-72) was used as a carbon powder. Evaluation of the oxygen reduction activity was carried out in quite the same manner as in Example 3.

Figure 10:
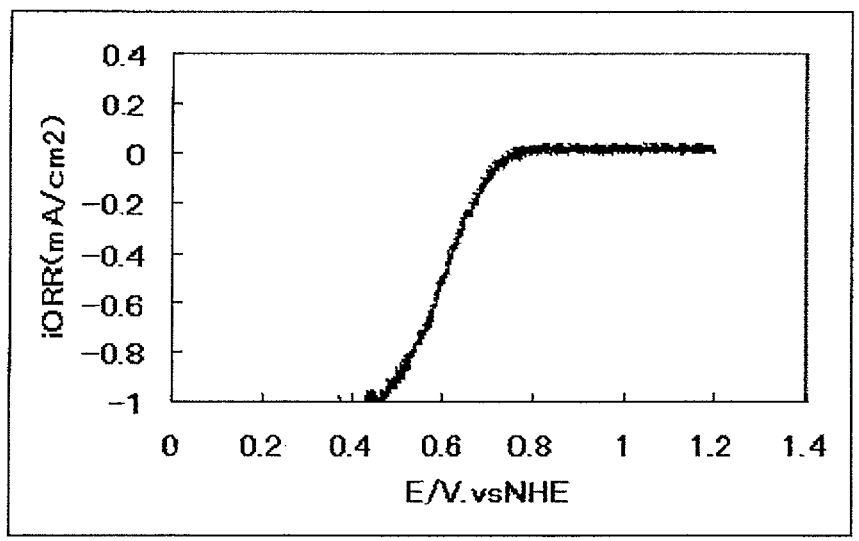
FIG. 10 shows a current-potential curve of Comparative Example 3.

As a result, the oxygen reduction onset potential was 0.85V (vs. NHE), as shown in FIG. 10, and the oxygen reduction current density at a potential of 0.7 V was 0.35 (mA/cm²). However, in the evaluation of durability after holding of the electrode at 80° C. for 2000 hours at a potential of 1.2 V, the oxygen reduction onset potential dropped to 0.53 V, and the oxygen reduction current at a potential of 0.7 V could not be measured.

Comparative Example 4

A cell was fabricated in quite the same manner as in Example 5, except that a gas diffusion electrode fabricated in quite the same manner as the platinum anode used in Example 5 was used instead of the niobium cathode used in Example 5. Then, the cell properties of the polymer electrolyte fuel cell were evaluated.

As a result, the maximum output value of this cell was 0.31 W/cm². If the price of platinum is supposed to be 3000 yen/g, the cost unit requirement based on 1 g of the cathode active substance is about 0.10 W/yen.

The invention claimed is:

1. A catalyst for a polymer electrolyte fuel cell, comprising a graphitized carbon powder and a niobium oxycarbonitride or a titanium oxycarbonitride as an active substance,
   wherein the carbon powder is a carbon powder having been obtained by heating carbon black at not lower than 2500° C. in a non-oxidizing atmosphere, and
   wherein boron is contained in an amount of 0.01 to 5% by mass in the carbon black.

2. The catalyst for a polymer electrolyte fuel cell as claimed in claim 1, wherein the carbon black is at least one substance selected from the group consisting of oil furnace black, acetylene black, thermal black and channel black.

3. The catalyst for a polymer electrolyte fuel cell as claimed in claim 1, further comprising a fibrous carbon.

4. The catalyst for a polymer electrolyte fuel cell as claimed in claim 3, wherein the fibrous carbon is a vapor grown carbon fiber.

5. The catalyst for a polymer electrolyte fuel cell as claimed in claim 4, wherein the vapor grown carbon fiber is a carbon fiber having been graphitized at a temperature of not lower than 2500° C., and the boron content in the carbon fibers is in the range of 0.01 to 5% by mass.

6. The catalyst for a polymer electrolyte fuel cell as claimed in claim 1, wherein the niobium oxycarbonitride is represented by the compositional formula NbCxNyOz, wherein x, y and z represent a ratio of the number of atoms and are numbers satisfying the conditions of $0.01 < x \leq 2$, $0.01 \leq y \leq 2$, $0.01 \leq z \leq 3$ and $x+y+z \leq 5$, and when the niobium oxycarbonitride is subjected to powder X-ray diffractometry (Cu—Kα rays), two or more diffraction peaks are observed between a diffraction angle 2θ of 33° and that of 43°.

7. The catalyst for a polymer electrolyte fuel cell as claimed in claim 1, wherein when the niobium oxycarbonitride is subjected to powder X-ray diffractometry (Cu—Kα rays), a peak assigned to $Nb_{12}O_{29}$ is observed.

8. The catalyst for a polymer electrolyte fuel cell as claimed in claim 1, wherein the titanium oxycarbonitride is represented by the compositional formula TiCxNyOz, wherein x, y and z represent a ratio of the number of atoms and are numbers satisfying the conditions of $0<x \leq 1.00$, $0<y \leq 1.00$, $0.1 \leq z \leq 3.0$, $1.0 \leq x+y+z \leq 5.0$ and $2.0 \leq 4x+3y+2z$, and by powder X-ray diffractometry (Cu—Kα rays), the titanium oxycarbonitride is found to have a rutile-type crystal structure.

9. A polymer electrolyte fuel cell having a cathode catalyst layer containing the catalyst as claimed in claim 1.

* * * * *